July 17, 1951 E. D. GEORGE 2,561,019
TUBE SPLICING APPARATUS
Filed Oct. 8, 1949 6 Sheets-Sheet 1

INVENTOR.
EVERETT D. GEORGE
BY
R. L. Miller
ATTORNEY

INVENTOR.
EVERETT D. GEORGE
BY
ATTORNEY

July 17, 1951     E. D. GEORGE     2,561,019
TUBE SPLICING APPARATUS Filed Oct. 8, 1949     6 Sheets-Sheet 3

INVENTOR.
EVERETT D. GEORGE
BY
P. L. Miller
ATTORNEY

Inventor
EVERETT D. GEORGE

July 17, 1951 E. D. GEORGE 2,561,019
TUBE SPLICING APPARATUS
Filed Oct. 8, 1949 6 Sheets-Sheet 6

Inventor
EVERETT D. GEORGE

By
R. L. Miller
ATTORNEY

Patented July 17, 1951

2,561,019

UNITED STATES PATENT OFFICE 2,561,019

TUBE SPLICING APPARATUS

Everett D. George, Cuyahoga Falls, Ohio, assignor to Wingfoot Corporation, Akron, Ohio, a corporation of Delaware Application October 8, 1949, Serial No. 120,337

17 Claims. (Cl. 154—9)

The present invention relates to an improved form of apparatus for splicing the ends of rubber or plastic articles of indeterminate lengths to form endless bands, inner tubes, and the like. More particularly, the invention pertains to certain safety features designed for the protection of the machine operator and embodied in apparatus for joining the ends of unvulcanized inner tube stock, tread stock, and other similar material.

It is an object of the present invention to provide a control mechanism for splicing apparatus and the like which will require the operator to keep his hands free of the several moving parts of the machine while initiating the complete cycle of operations which it performs.

It is a further object of the present invention to provide means preventing the unauthorized movement of certain of the moving parts of a splicing machine in the event of the failure of the medium which affords the means for the actuation of the parts.

Other objects and advantages of the present invention will be readily understood as the description of a preferred form of splicing apparatus illustrated in detail in the accompanying drawings proceeds.

Figure 1:
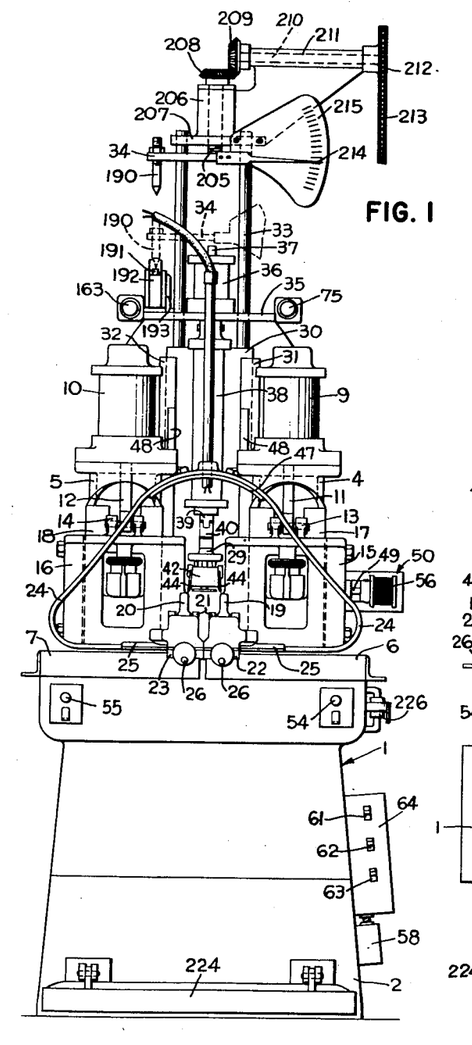
Fig. 1 is a front elevation of a typical splicing apparatus with which the teachings of the present invention are advantageously adapted to be employed.
Figure 2:
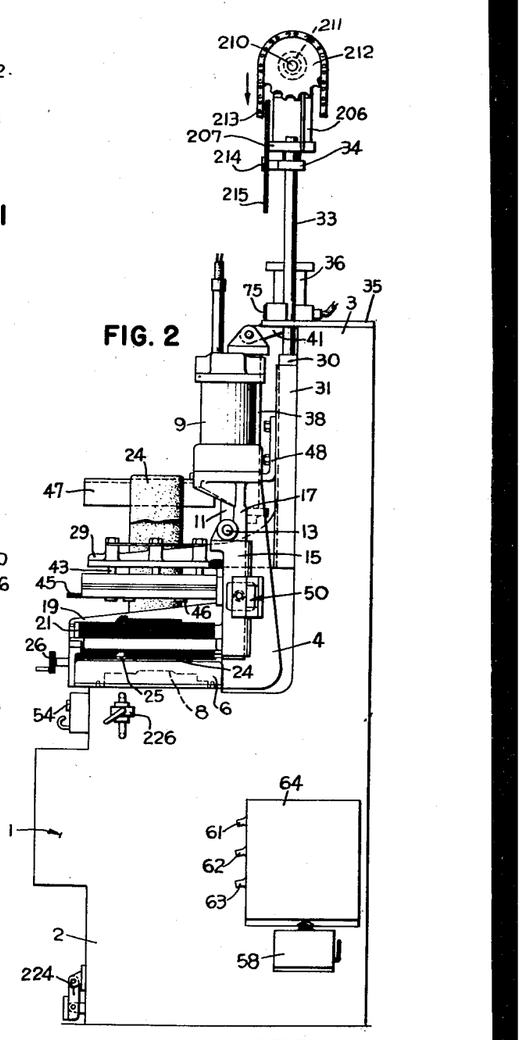
Fig. 2 is a side elevation of the apparatus of Fig. 1.

In the preferred embodiment of the invention illustrated in Figs. 1 and 2 of the drawings, the splicing apparatus indicated generally by the reference numeral 1 comprises a frame structure which embodies a base portion 2 and an upright portion 3. Directly in front of the upright portion 3 of the frame structure is disposed a pair of vertical supports 4, 5 which are secured to or form part of carriages 6, 7 which are supported on the bed 8 of the base portion 2 of the frame structure for slidable movement toward the right and left in a horizontal plane as seen in Fig. 1. The carriage means or carriages 6 and 7 are adapted to be moved on the bed 8 toward and away from each other during the actuation of the apparatus.

On the uppermost ends of the vertical supports 4 and 5 are disposed the pressure cylinders 9 and 10, respectively. The pressure cylinders 9 and 10 are provided with piston rods 11 and 12, respectively, which are, in turn, connected through suitable linkages 13, 14 to the slide members 15 and 16. The slide members 15 and 16 are mounted for slidable movement in a vertical plane upon machine slides 17 and 18, respectively, formed on the vertical supports 4 and 5. The manner of mounting slide members 15 and 16 on machine slides 17 and 18 will be apparent from the drawings. Thus, the actuation of the pressure cylinders 9 and 10 serves to move the slide members 15 and 16 in a vertical path along the machine slides 17 and 18.

On the slide members 15 and 16 are mounted the clamp arms 19 and 20, respectively. The arms 19 and 20 extend outwardly from the face of the slide members 15 and 16 in a direction at right angles to the faces thereof and are substantially coextensive in length with the over-all width of the carriages 6 and 7, respectively, with which they are associated.

The clamp arms 19 and 20 embody a plurality of flat plates or segments 21 of generally U-shaped configuration supported by and disposed in face-to-face relation horizontally on the arms. The several segments 21 are mutually slidable in a plane normal to the axis of the clamp arms 19 and 20 on which they are supported and afford a highly flexible unitary clamping means. An inflatable air bag A (see Fig. 5 of the drawings) is disposed internally of the body formed by the several segments 21 and the supporting portion of each clamp arm 19, 20 to exert a predetermined amount of pressure, upon inflation, against the bight portion of the several segments to force them into edge contact with the surfaces of each of a pair of cooperating adjustable guide members 22 and 23 or any object supported thereon.

A very satisfactory clamping action is thus achieved with the slide members 15 and 16 in their lowermost positions and with the several segments 21 thereon being forced downwardly. These clamp arms 19 and 20 are capable of holding an object of any shape such, for example, as the ends of the tube stock 24 in position on the guide members 22 and 23, respectively, on the carriages 6 and 7 for manipulation through a series of operations which must be performed thereon to complete the fabrication of the material into an endless inner tube.

The adjustable guide members 22 and 23 are substantially identical in construction. Each of the guide members 22, 23 embody an abutment block 25 (Fig. 2) which is adjustably mounted thereon as by means of a screw (not shown) actuated by the hand wheel 26. The shifting of the abutment block 25 in a horizontal plane in a direction normal to the direction of movement of the carriages 6 and 7 enables the careful alignment of the ends of the tube stock 24 with respect to each other so as to insure a perfect splice when the ends are subsequently brought together.

Before the splicing operation can be performed in the apparatus, it is necessary to provide a freshly cut or tacky end on the tube stock 24 at the point where the ends are to be spliced together. To facilitate this operation and to support the projecting ends of the tube stock 24, an anvil 27 is disposed between the carriages 6 and 7 for cooperation with the guide members 22 and 23, respectively, thereof during the cutting operation (see Figs. 3, 4, and 5). The anvil 27 is adapted to be moved vertically into and out of position between the carriages 6 and 7 as by means of a piston rod 28 which is actuated in a manner to be described more fully hereinafter.

The apparatus thus far described is concerned primarily with the clamping means for holding the tube stock 24 in place during the cutting and splicing operations performed by the splicing apparatus 1. The cutting operation is performed by another portion of the apparatus set in motion in properly timed sequence with the actuation of the slide members 15 and 16 and the horizontal motion of the carriages 6 and 7 as well as the vertical movement of the anvil 27. The operation of the several elements of the clamping mechanism and their association with the elements of the cutting apparatus will be more fully described hereinafter in connection with the description of the mode of operation of the apparatus.

The cutting element of the splicing apparatus 1 embodies a knife supporting arm 29 which is secured to or formed as a part of a slide member 30 supported in slidable relation to the upright portion 3 of the frame structure (see Figs. 1 and 2). The slidable mounting for the slide member 30 comprises the vertically disposed elements 31 and 32 secured to the upright portion 3 of the frame which cooperate to form a machine slide defining the desired vertical path of the slide member 30 therebetween. A pair of vertically extending rods 33 are fixed to the uppermost end of the slide member 30 and carry a transversely disposed cross piece 34.

In the vertical movement of the slide member 30, the rods 33 are adapted to be slidable in a pair of clearance holes in a top plate 35 secured to the uppermost end of the upright portion 3 of the frame structure. Disposed between the rods 33 is a pneumatic cushion brake 36, the projecting end of plunger 37 of which is adapted to be contacted by the cross piece 34 mounted on the uppermost ends of the rods 33 when the slide member 30 carrying the rods approaches the lowermost extremity of its vertical motion.

This cushion brake 36 acts to halt the sharp descent of the slide member 30 and its arm 29 momentarily as they approach the lowermost extremity of their travel during the cutting operation. This stopping of the arm 29 will be explained in detail hereinafter.

The slide member 30 and its arm 29 are moved in their vertical path as by means of a pressure cylinder 38 which is provided with a piston rod 39 connected by suitable linkage 40 to the arm 29. The pressure cylinder 38 is supported in a vertical position, being suspended at its uppermost end from the top plate 35 as by means of the projecting boss 41 formed thereon. A knife support 42 (Fig. 3) is suspended by suitable means in spaced relation to the arm 29 so as to extend substantially parallel thereto, the spacing being achieved by the several bosses 43 formed on the under side of the arm 29. The knife support 42 carries a pair of knife blades 44 adjustably secured to the support which embodies therein a suitable means such, for example, as an electrical resistance element (not shown) for heating the blades to facilitate the cutting operation.

A strip 45 is resiliently supported from the knife support 42 between the knife blades 44 so as to extend in generally parallel relation thereto. The strip 45 serves to support thereon a plurality of flat spring elements 46 made of flexible spring steel or other similar material. A number of the spring elements 46 may be disposed in predetermined spaced relation (see Fig. 2) so as to correspond generally with the margins of the various sizes of tube stock 24 which are to be spliced together in the splicing apparatus 1.

The springs 46 resiliently supported and projecting slightly below the cutting edges of the knife blades 44 come into contact with the marginal portions of the tube stock 24 just before the cutting edges of the knife blades do. In this way, the material is flattened out against the upper surface of the anvil 27 when the latter is in position between the carriages 6 and 7 for the performance of the cutting operation. The resilient support of the strip element 45 and the use of springs 46 produces a flattening out of the margins of the tube stock 24 before the knife blades 44 pass through the material as the arm 29 is lowered for the cutting operation.

The trimming of the ends of the tube stock 24 affords a fresh tacky surface on the ends of the material. This tacky condition of the ends of the tube stock 24 enables the said ends, when brought together in intimate contact with each other, to stick together temporarily until the spliced endless toroid thus formed is subjected to a vulcanizing operation. Vulcanization of the tube stock segment so joined renders the bond a permanent one.

A detailed description of the operative steps employed in the manufacture of inner tubes by the use of the splicing apparatus 1 will aid in acquiring a knowledge of the character and mode of operation of certain of the safety features embodied in the machine.

The operator places the pre-cut segment of tube stock 24 over a support or saddle 47 suspended from the vertically disposed elements 31 and 32 by means of brackets 48 with its open ends hanging downwardly. The free ends of the tube stock 24 are next brought into position with one end extending across the guide member 22 and the other extending across the guide member 23 with the corresponding marginal edges of both ends against the abutment blocks 25 (see Fig. 2). In production, the abutment blocks 25 are adjusted at the start of a given run of sizes and types of stock to insure that the transverse dimension of the ends of the tube stock 24 will be located substantially intermediate the over-all span of each arm 19 and the several segments 21 thereon.

Figure 3:
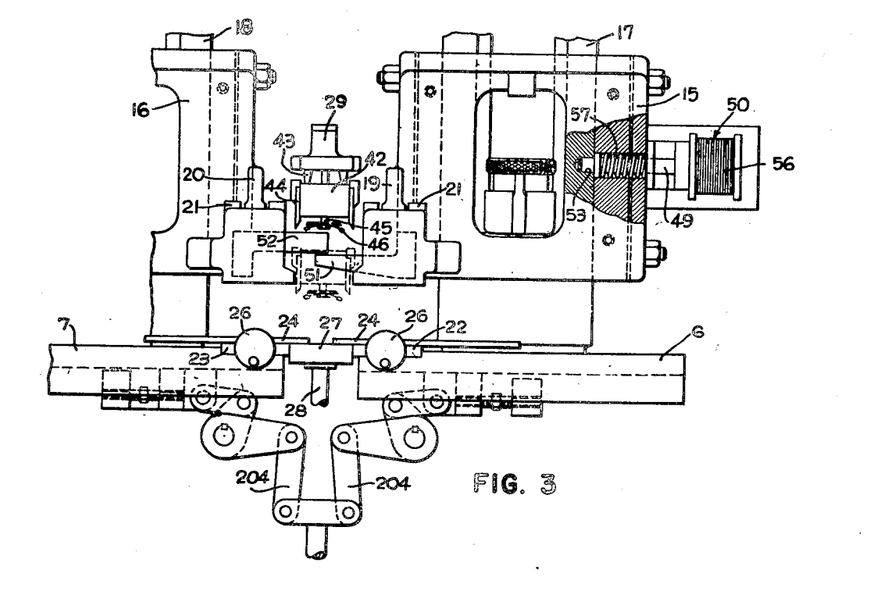
Figs. 3, 4, 5, and 6 are enlarged front elevations of a portion of the apparatus of Fig. 1 with parts in section and broken away.

As will be noted from Fig. 3, when the guides 22, 23 are employed, the tube stock 24 is in its proper position when one edge thereof is against the abutment block 25 on each of the guides. When the splicing apparatus 1 is ready for the start of a new cycle of operations, the carriages 6 and 7 and the anvil 27 are in their respective positions as illustrated in Fig. 3 to support the tube stock 24, the ends of which project slightly beyond the edges of the guides 22, 23 and onto the anvil.

The slide members 15 and 16 are in their uppermose positions on the machine slides 17 and 18, being held there against inadvertent lowering thereof as by means of the cooperative action of the latch means or retractible core 49 of the safety latch actuating means or solenoid 50 and the cooperating stop means or fingers 51, 52 mounted on the arms 19 and 20, respectively. The core 49 of the solenoid 50 engages the socket 53 drilled in the wall of the machine slide 17 during the time the operator is putting the ends of the tube stock 24 in place in the apparatus preparatory to completing the splicing operation. These safety features serve to prevent accidents resulting either from the inadvertent operation of the apparatus or from the failure of certain of the sources of power for controlling the action of the knife arm 29 and/or the clamp arms 19 and 20. A complete description of the several safety features comprising the present invention and their operation will be given hereinafter.

After the tube stock 24 is in place on the guide members 22 and 23 and anvil 27 and the ends thereof are properly aligned, the operator simultaneously presses the dual starting buttons 54, 55. As a safety measure, the apparatus is so designed that it is necessary for the operator to place both hands on the starting buttons 54, 55, thereby removing his hands from the danger area beneath the clamping arms 19 and 20 and the knife arm 29. The electrical circuit, as will presently be seen, is so constituted that the operator must keep the buttons 54, 55 depressed until after the pressure cylinders 9, 10 have operated to move the slide members 15, 16 with their clamping arms 19, 20, respectively, and the knife blades 44 into their lowermost position in contact with the ends of the tube stock 24 and the top surface of guide members 22, 23.

Figure 4:
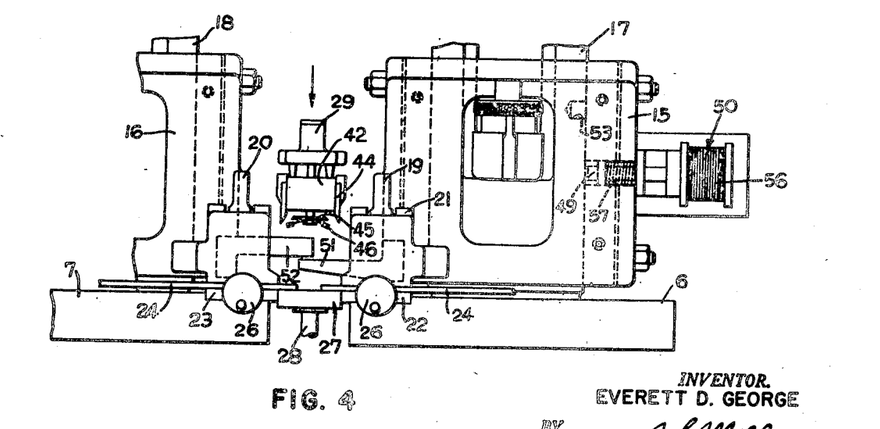

As will be noted from Fig. 2, the several segments 21 are so arranged on the arms 19, 20 that they will readily adjust themselves normal to the horizontal axes of the arms in such fashion that they approximate the contour of the stock 24. The airbags A associated with the clamping arms 19, 20 are maintained only partially inflated at low pressures. In each instance, the several segments 21 are urged downwardly by the pressure exerted against the bight of the segments by the airbag A. The several segments 21 are thus brought into contact with the material to be spliced, thereby insuring a clamping action on the material as long as the airbags remain inflated. Thus, the second stage in the cycle of operations of the splicing apparatus 1 is illustrated in Fig. 4.

It will be noted that, when the operation of the apparatus is properly initiated, the core 49, by virtue of the energization of the coil 56 of the solenoid 50, is disengaged from the socket 53 against the action of the compression spring 57. This operation frees the slide member 15 to begin its downward movement to bring the arm 19 into clamping position by the actuation of the pressure cylinder 9. The pressure cylinder 10 simultaneously initiates the downward movement of the slide member 16. The slide member 16 is now free to move since the finger 51 on the arm 19 is simultaneously moved away from the finger 52 on the arm 20 and thereafter does not restrict the downward movement of the latter.

Suitable adjustment features limiting the vertical and horizontal motion of the slide members 15 and 16 with respect to their respective machine slides 17 and 18 are provided, but will not be described here inasmuch as these elements of the apparatus form no part of the present invention. The features in question are fully described and claimed in the copending George application, Serial No. 59,647 filed November 12, 1948, now Patent No. 2,541,696, February 13, 1951.

It will be readily understood that when the arms 19 and 20 are disposed in their uppermost position, the engaging fingers 51 and 52 will coact to provide an effective stop means to prevent the knife arm 29 carrying the knives 44 from falling. As long as the core 49 engages the socket 53, the slide member 15 cannot drop down even though the supply of power or air should fail for any reason. The cooperative engagement of the finger 52 on the arm 20 associated with the slide member 16 and the finger 51 on the arm 19, as long as the slide 15 is latched in the manner described, prevents slide member 16 from any inadvertent or unauthorized downward movement.

At the same instant that the clamp arms 19 and 20 move downwardly toward clamping contact with the ends of the tube stock 24, the knife supporting arm 29 is started downward by the pressure cylinder 38 which actuates the slide slide member 39 on which the arm is mounted (see Fig. 4). The clamp arms 19 and 20 will bottom just an instant before the knife blades 44 contact the tube stock 24. As the arm 29 descends, the cross piece 34 between the rods 33 carried by the slide member 30 comes into contact with the plunger 37 of the cushion brake 36 which momentarily stops the downward travel of the knives 44 just after they have started through the tube stock 24. This momentary halting of the knives 44 in the cutting operation serves to permit the stock to regain its normal shape at least partially after the original pressure due to the knife impact is relieved, thereby facilitating a clean straight cut. The third stage in the cycle of operations and the association of the several elements of the apparatus are illustrated in Fig. 5.

It should be noted in passing that after the knife supporting arm 29 is down, the operator may remove one or both hands from the starting buttons 54, 55 and the machine will continue its complete cycle without additional initiation of the controls. However, should the operator remove even one hand from the starting buttons 54, 55 before the said arm 29 is down the several slide members 15, 16 and 30 will return to their original positions as shown in Fig. 3 and will lock in place temporarily to permit the controls to complete their entire cycle of operation and return once more to their original starting relation. Thereafter, the operator may again start a new cycle provided he keeps both starting buttons 54, 55 depressed until the elements of the apparatus have assumed the operating positions of the third stage shown in Fig. 5.

Figure 5:
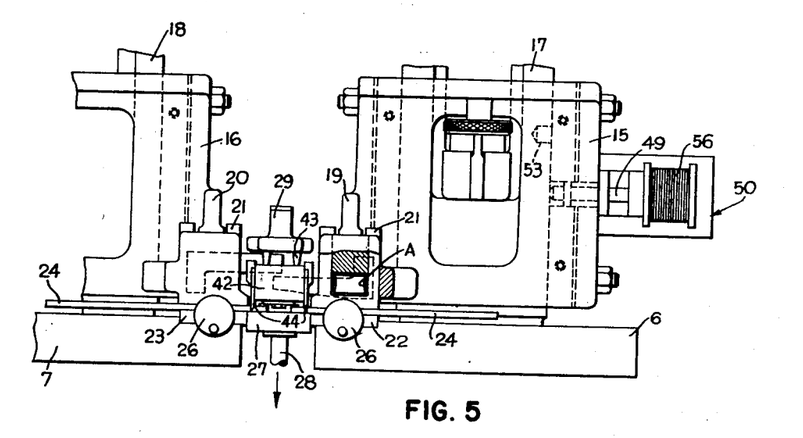

With the ends of the stock 24 trimmed off by the cutting step of Fig. 5, the anvil 27 is next retracted, an air blast is directed across the face of the anvil, and the trimmed stock is blown into a suitable receptacle (not shown) in the base portion 2 of the frame structure of the splicing apparatus I. The carriages 6 and 7 with the ends of the tube stock 24 still held firmly in place on the guide members 22 and 23 move or back away from each other after which the knife supporting arm 29 is returned to the uppermost extremity of its path. In predetermined timed relation to these operations, the carriages 6 and 7 are thereafter moved horizontally of the bed 8 toward each other with the ends of the tube stock 24 still held securely in place, thereby enabling the freshly cut tacky ends to be jammed together to produce a temporary bond between the stock ends as will be seen in Fig. 6.

Figure 7:
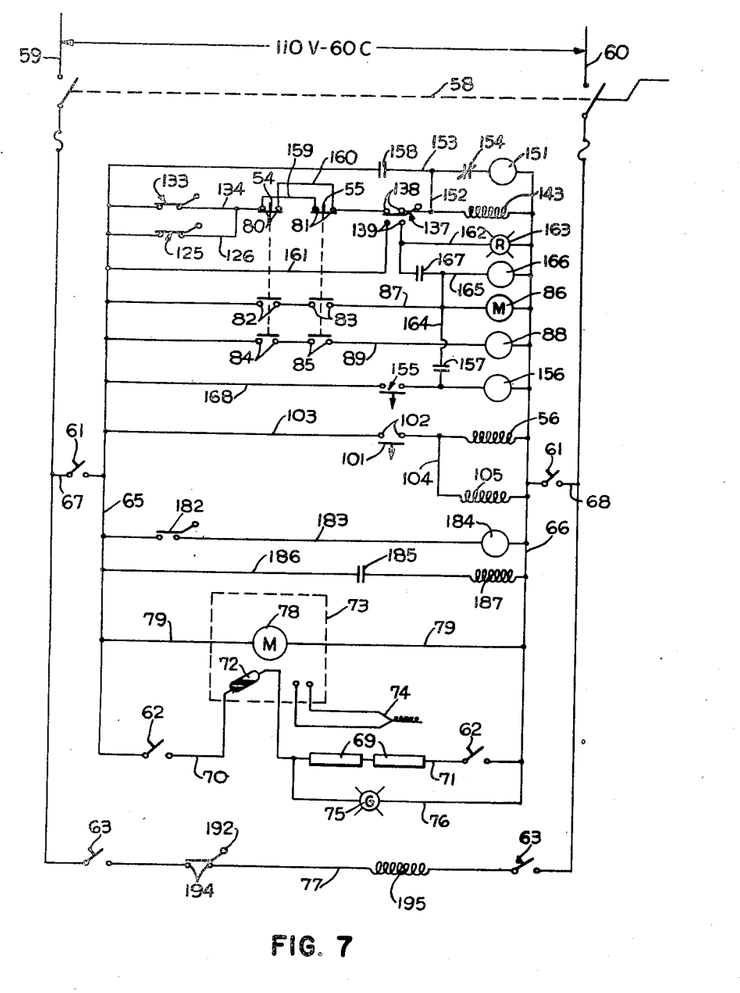
Fig. 7 is a diagrammatic representation of the control and operating circuit of the apparatus of Figs. 1 and 2.
Figure 8:
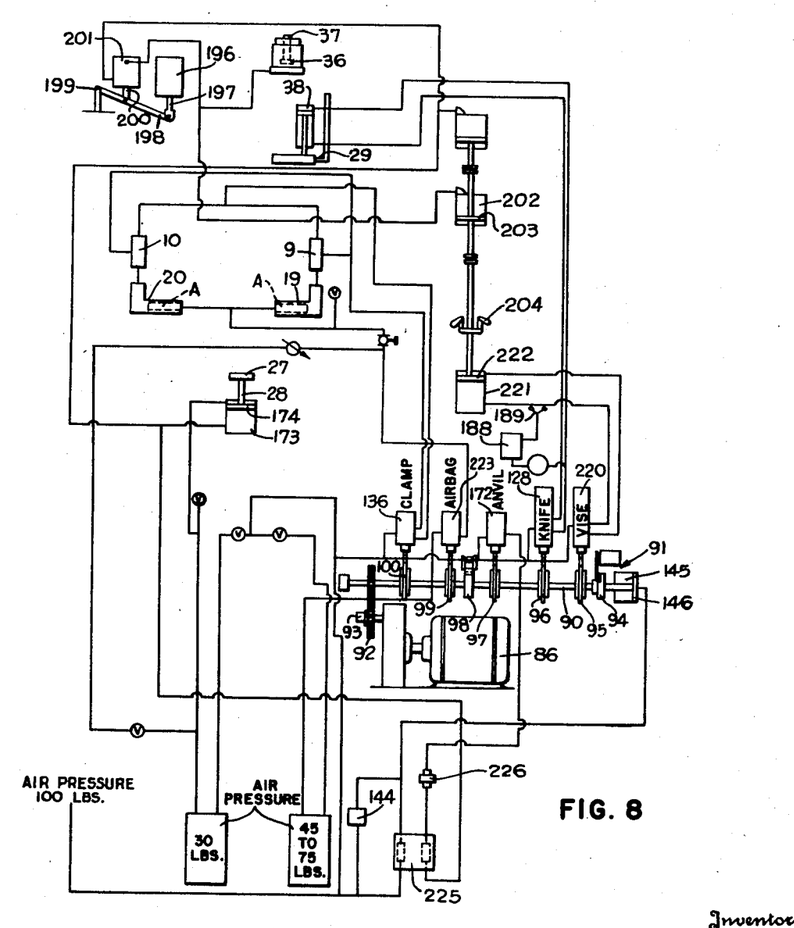
Fig. 8 is a diagrammatic representation of the piping system for the pneumatically operated elements of the splicing apparatus.

Referring now to the electrical wiring diagram of Fig. 7 and the piping diagram of Fig. 8, it will be noted that the double pole main switch 58 must first be closed to supply electrical power to the splicing apparatus I from power lines 59 and 60. Next, the toggle switches 61, 62, and 63 in the control box 64 mounted on the base portion 2 of the splicing apparatus I must be closed by the operator to place the unit in condition to perform all of its intended operations.

The double pole toggle switch 61 serves to connect the machine circuit embodying the conductors 65 and 66 with the main power lines 59 and 60 through the conductors 67 and 68. The double pole toggle switch 62 opens and closes a circuit embodying the heating elements 69 for each of the knives 44 and conductors 70 and 71 connected to opposed terminals of a mercury switch 72 of a conventional temperature control unit 73. A thermocouple 74 of the temperature control unit 73 disposed in the knife support 42 insures the maintenance of a predetermined operating temperature for the knives 44.

The green signal light 75 is connected between conductors 66 and 70 as by means of conductor 76 and indicates to the operator that a flow of electrical current to the heater units 69 is being maintained and controlled by the temperature control unit 73. The motor 78 of the temperature control unit 73 is connected into the operating circuit for the splicing apparatus embodying the conductors 65 and 66 as by means of the conductor 79.

The purpose of the double pole toggle switch 63 will be explained in detail and in its proper relation in the description of the operation of the splicing apparatus I. For the present at least it is sufficient to observe that the conductor 77 is connected across the main power lines 59 and 60 by the closing of the contacts of the toggle switch 63.

The splicing apparatus I is now in readiness for operation with the several elements of the apparatus in the relationship illustrated in Fig. 3 of the drawings and previously described. As soon as the precut segment of tube stock 24 is in place over the saddle 47 (see Fig. 4) with its open ends in position on the guide members 22 and 23, the operator presses the buttons 54 and 55 maintaining both hands in position thereon to keep the buttons depressed. This action results in the breaking of contacts 80 and 81 for the buttons 54 and 55, respectively, and the closing of contacts 82, 84 and 83, 85.

The closing of the contacts 82 and 83 of push buttons 54 and 55, respectively, completes the circuit across conductors 65, 66 through the timer motor 86 by means of the conductor 87. The simultaneous closing of contacts 84 and 85 also closes the open circuit through the time relay delay mechanism 88 connected to the conductors 65 and 66 as by means of the conductor 89. The energizing of the timer motor 86 initiates the rotation of the cam shaft 90 of the timer unit 91 (see Fig. 9) through a suitable gear train 92 and the friction clutch 93.

The cam shaft 90 has mounted thereon a number of cam disks 94, 95, 96, 97, 98, 99, and 100 of predetermined peripheral contour as illustrated in Figs. 13 to 19, inclusive, for defining the complete cycle of operations of the splicing apparatus I. The several cam disks 94, 95, 96, 97, 98, 99, and 100 are arranged in spaced coaxial relation along and mounted on hubs keyed to the cam shaft 90 so as to rotate therewith when the timer motor 86 is energized.

Simultaneously with the energizing of the timer motor 86, the time relay delay mechanism 88 is energized causing the contactor 101 thereof to close the contacts 102. A circuit is thus completed through conductor 103 between the conductors 65 and 66, thereby energizing the coil 56 of the solenoid 59 and retracting the core 49 against the action of the spring 57 as a result of which the core 49 is immediately disengaged from the socket 53 in the machine slide 17. This action frees the slide member 15 which, as will be apparent from Fig. 3, likewise renders the corresponding slide member 16 capable of being shifted along its machine slide 18.

With the completion of a circuit through the conductor 103, a circuit is also completed through the conductor 104 and the coil 105 of the stop solenoid 106. As will be apparent from Fig. 10, the energizing of the coil 105 of solenoid 106 will retract the core 107 against the action of the weight 108 which is suspended therefrom by the link 109 and serves to overcome any residual magnetism in the core or other factors which tend to prevent free release of the core when the coil 105 is deenergized. The retraction of the core 107 raises the lever arm 110 connected thereto about its fixed pivot 111. The pivoting of lever arm 110 raises the link 112 and disengages the latching member 113 from the abutment 114 on the stop cam 98 mounted on the cam shaft 90 of the timer unit 91, thereafter permitting the free rotation of the cam shaft by the timer motor 86.

Figures 9, 10, 11, 12, 13, 14, 15, 16, 17, 18, 19:
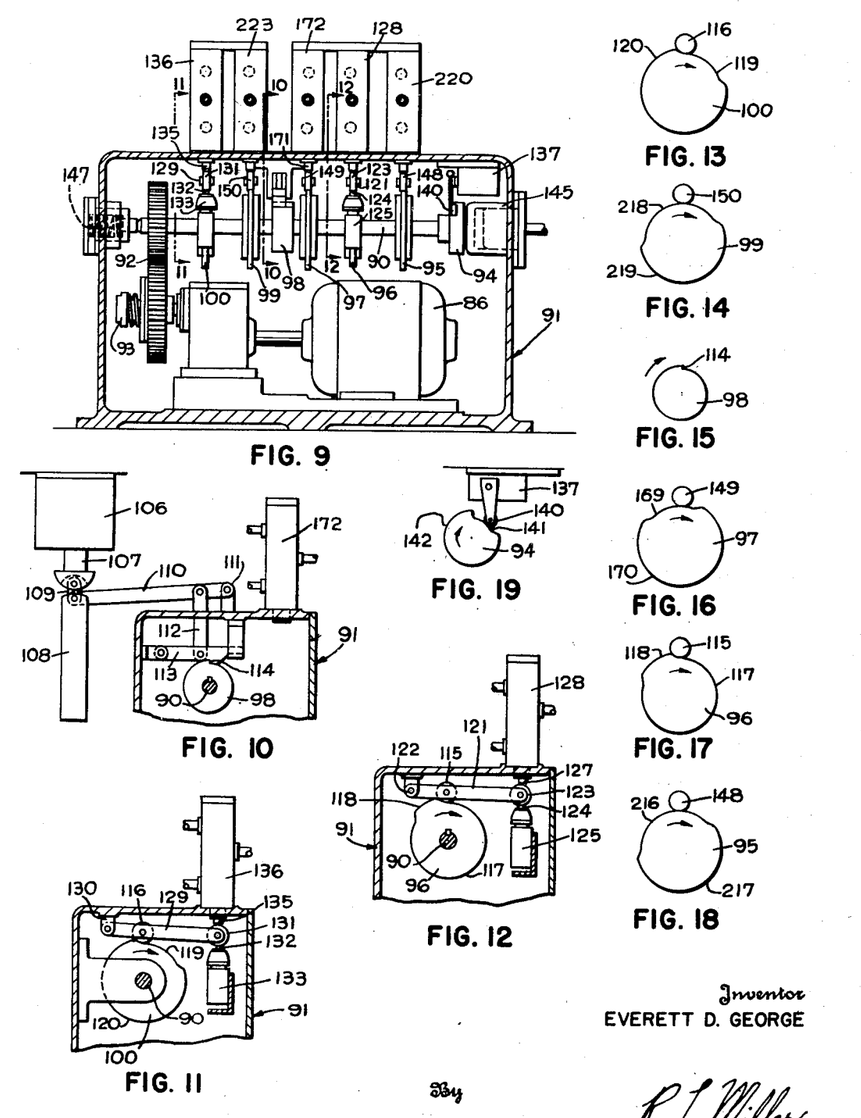
Fig. 9 is a vertical cross section of one form of timer mechanism which may be advantageously employed in the control circuit of the splicing apparatus.
Figs. 10, 11, and 12 are partial vertical cross sections along the lines 10—10, 11—11, and 12—12, respectively, in Fig. 9.
Figs. 13 to 19, inclusive, illustrate the form of the several cam members in the timer mechanism.

The cam shaft 90 now begins to rotate slowly and the several cam disks 94 to 100, inclusive, likewise rotate. It will be apparent from the contour of the cam disks 96 and 100 and the relative positions of the followers 115 and 116, respectively, as shown in Figs. 17 and 13, respectively, that they will begin to trace the high points on their cam disks as soon as the shaft 90 begins to turn. The follower 115 shifts from the peripheral portion 117 of the cam disk 96 to the portion 118 thereof, while the follower 116 simultaneously moves from the portion 119 of its cam disk 100 to the portion 120 thereof.

As will be seen in Fig. 12, when the follower starts to trace the portion 118, the lever arm 121 will pivot about its fixed pivot point 122. The shifting of the lever arm 121 releases the pressure of the roller element 123 against the plunger 124 of the normally closed microswitch 125, allowing the switch to assume its normal closed position. The microswitch 125 connected in the conductor 126 was held open at the beginning of operations. At the instant the lever arm 121 moves upward in the manner described, the roller element 123 shifts the core 127 of the pneumatic valve 128 so that air under pressure is admitted to the upper end of the pressure cylinder 38 (see Fig. 8), initiating the downward motion of the arm 29.

It will be noted from Fig. 11 that, simultaneously with the actuation of the lever arm 121, the lever arm 129 will be swung upwardly about its pivot point 130 as the follower 116 is shifted from the portion 119 to the portion 120 with the rotation of the shaft 90 of the timer unit 91. The moving of the lever arm 129 releases the pressure of the roller element 131 upon the plunger 132 of the normally closed microswitch 133 permitting it to assume its normal closed position. The microswitch 133 connected in the conductor 134, like its counterpart microswitch 125, was held open from the start of operations. The shifting of the lever arm 129 also causes the roller element 131 to shift the core 135 of the pneumatic valve 136 thereby directing air under pressure into the uppermost ends of the pressure cylinders 9 and 10 as will be seen from Fig. 8.

The air supplied to pressure cylinders 9 and 10 causes the slide members 15 and 16 to descend, thereby bringing the several segments 21 on the clamp arms 19 and 20 into clamping contact with the ends of the tube stock 24 disposed on the guide members 22 and 23 in the relationship shown in Figs. 1 and 4 of the drawings. As previously indicated, the air bags A in the clamp arms 19 and 20 (see Fig. 8) are maintained inflated with air at a pressure of 8 to 12 pounds per square inch throughout the preliminary steps in the operation of the splicing apparatus 1. At a predetermined interval in the cycle of operations, the inflation pressure of the air bags A is momentarily increased to 40 pounds per square inch in a manner to be explained in greater detail hereinafter.

Actually, the interval between the bottoming of the clamp arms 19 and 20 as seen in Fig. 4 and the contact of the heated knife blades 44 with the tube stock 24 or the positions assumed by the parts as shown in Fig. 5 of the drawings is extremely short. In Fig. 4 the clamp arms 19 and 20 have been illustrated as being fully down against the tube stock 24 while the arm 29 is still descending as indicated by the arrow. However, as indicated, the two steps follow each other so closely in timing as to be substantially simultaneous in their occurrence in the cycle of operations of the splicing apparatus 1.

The introduction of air to the pressure cylinder 38, as we have seen, actuates the arm 29 and the knife support 42 carrying the heated knife blades 44 downwardly. The hot knife blades 44 sever the projecting edges of the ends of the segment of tube stock 24 and create a tacky surface on the cut ends of the stock. This tacky surface on the cut ends of the tube stock 24 is sufficient when the freshly cut ends are forcibly brought together by the application of a jamming pressure to produce an endless tube which, upon removal from the splicing apparatus 1, is ready to be vulcanized.

In the cutting operation one additional feature should be explained in greater detail. As the slide member 30 of which the arm 29 is a part descends, the vertically extending rods 33 on the uppermost end of the slide member which carry the cross piece 34 bring the latter into contact with the exposed end of the plunger 37 of the cushion brake 36, thereby momentarily arresting the descent of the knife blades 44 which have just begun to cut through the top side of the tube stock 24. As the air is released from the cushion brake 36 by the pressure on the plunger 37, the knife blades 44 complete the cut. This hesitating action insures a clean straight cut surface on the ends of the segment of tube stock 24 since the stock is thus given an opportunity to rebound from the effect of its first contact with the blades 44.

It is preferable at this point to explain the action of one of the important safety features of the splicing apparatus 1 involving the principles of the present invention. It is to be noted that only after the clamp arms 19 and 20 and the knife arm 29 have reached substantially their lowermost position may the operator remove his hands from the push buttons 54 and 55 without immediately arresting the cycle which has been initiated by the splicing apparatus 1. If either one or both of the push buttons 54 and 55 are released before the clamp arms 19 and 20 and the knife 29 have bottomed, the slide members 15, 16, and 30 will return to their uppermost positions and will remain there until the next cycle of the splicing apparatus 1 is properly initiated.

Let us assume first that the operator removes both hands from the push buttons 54 and 55 before the danger point in the cycle is passed. It will be noted from Fig. 7 that the push buttons 54 and 55, upon release, will reestablish a circuit across contacts 80 and 81 in the conductor 134 since the microswitch 133 which is normally closed is no longer held open by the roller element 131 (see Fig. 11) and the maintaining switch 137 is still in the position shown across the contacts 138 leaving the contacts 139 open. This relationship will be apparent from the fact that the broad faced cam disk 94 (see Fig. 19) which operates the maintaining switch is so designed that the follower 140 continues to trace the low portion 141 on the cam for a predetermined interval after the shaft 90 has begun to rotate the several cam disks before it moves to the high portion 142.

A circuit completed across the conductor 134 thus energizes the coil 143 of the safety solenoid valve 144 admitting air under pressure to the cylinder 145 acting against the piston 146 to move the shaft 90 of the timer 91 axially against the spring 147 or to the left as shown in Figs. 8 and 9. The shifting of the shaft 90 moves the cam disks 95, 96, 97, 99, and 100 out of contact with their followers 148, 115, 149, 150, and 116, respectively, preventing any further operation of the splicing apparatus 1. It will be noted that the broad faced cam disk 94 will still register with its follower 149 and cam disk 98 will engage its latching member 113 despite the shifting of the shaft. Thus, the shaft 90 will continue its rotation the same as it would in completing the machine cycle or until the latching member 113 engages the abutment 114 on the cam disk 98 and switch 137 assumes the position shown in Fig. 7 at which point the splicing apparatus is ready to be operated in the proper manner.

With the completion of the circuit across the conductor 134, the time relay delay mechanism 151 is energized by reason of its connection to the conductor 134 through conductors 152 and 153 and the closed contact 154. The energizing of the time relay delay mechanism 151 closes the contactor 155 causing the relay 156 to close the previously open contacts 157 and 158 and open the normally closed contact 154 (see Fig. 7). In this way the time relay delay mechanism remains connected as by means of the conductor 153 across the conductors 65 and 66 even though the circuit across the contacts 138 of the maintaining switch 137 is broken by the action of the cam disk 94 and follower 140 shifting the switch to close the contacts 139, the results of which action will be described in detail hereinafter.

It will be understood that exactly the same series of steps will be initiated in the event that the operator removes only one of his hands from one of the push buttons 54, 55. The only deviation from the previously described operations is to be found in the readily apparent fact that one of the bridging conductors 159 or 160 (see Fig. 7) is required to cross whichever of the sets of contacts 80 or 81 of the push buttons 54 or 55 is being held open by the operator's one hand.

It should be noted at this juncture that the time relay delay mechanism 151 is adjustable to create a delay in its operation of a predetermined interval. The purpose of the device in the present instance is to afford a sufficient time interval to elapse before it functions to permit the delayed action of the cam disk 94 in operating the maintaining switch 137. In this brief interval the cam disk 94 will rotate with the shaft 90 to bring the portion 142 of the disk into contact with the follower 140. This action results in the opening of contacts 138 and the closing of contacts 139 of the maintaining switch 137.

The closing of contacts 139 completes a circuit through the conductors 161 and 162 between conductors 65 and 66 to light the red light 163 on the splicing apparatus 1 (see Fig. 1) indicating that the motor 86 of the timer unit 91 is operating. It should be noted that when the contacts 82 and 83 of the push buttons 54, 55 were closed, a circuit was also completed through conductors 87, 164 and a portion of conductor 165 to energize the relay 166 which closes the normally open contacts 167.

Thus, a circuit is established to the timer motor 86 through any of several different combinations of conductors. A first circuit is completed through conductor 87 as long as the push buttons 54 and 55 are depressed to close contacts 82 and 83. A second circuit is established through conductors 161, 164 and a portion of conductor 87 after the maintaining switch 137, operates to close contacts 139. A third circuit is created across conductors 168, 164 and a portion of 87 as long as the time relay delay mechanism 151 is operating. This is important in that it is necessary as each operating element of the unit performs its function to maintain the motor 86 operating to turn the shaft 90 in the timer unit to restore the cam disks to their original positions for the next cycle regardless of what may occur during the cycle which has begun.

Returning again to the normal operation of the splicing apparatus 1, we will now assume that the tube stock 24 has been trimmed. In this interval the follower 115 will have nearly completed its course along the portion 118 of the cam disk 96. It will be noted from Fig. 16 that just an instant before the follower 115 completes the above mentioned traverse, the follower 149 will abruptly shift from portion 169 to portion 170 of the cam disk 97 as the latter is rotated by the cam shaft 90 of the timer unit 91. This action shifts the core 171 of the pneumatic valve 172 introducing air to the upper end of the cylinder 173 actuating the piston 174 from which the anvil is supported by piston rod 28 (see Fig. 8).

Figure 6:
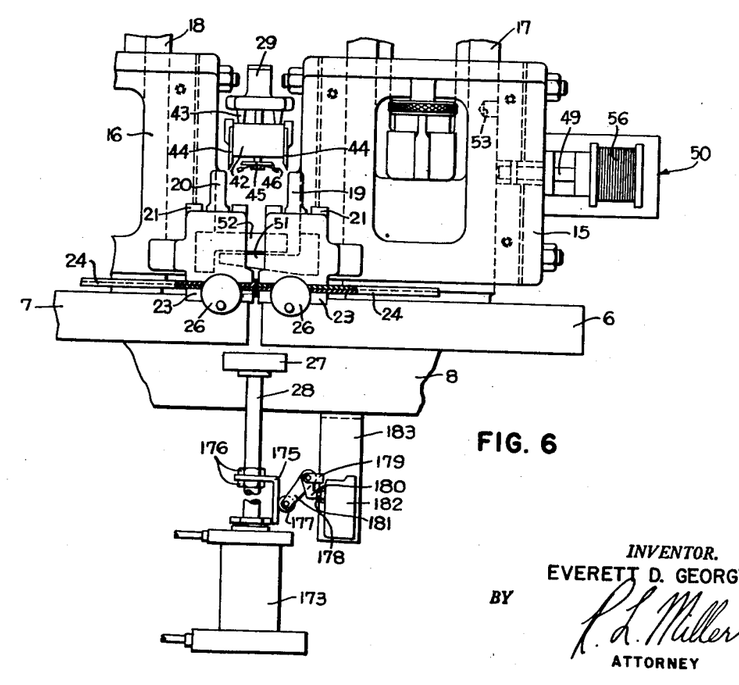

As the anvil 27 and the piston rod 28 start downward from the position shown in Fig. 5 toward that shown in Fig. 6, a trip 175 secured to the piston rod as by means of the jam nuts 176 strikes the roller 177 which actuates the lever arm 178 pivoted at 179. The lever arm 178 operates the link 180 which depresses the plunger 181 of the microswitch 182 mounted on a bracket 183 secured to the under side of the bed 8 of the splicing apparatus 1 (see Fig. 6). The closing of the microswitch 182 completes a circuit between the conductors 65 and 66 through the relay 184 the energization of which closes the normally open contacts 185 and completes a circuit between conductors 65 and 66 through the conductor 186 energizing a coil 187 (see Fig. 7), of the solenoid valve 188 (see Fig. 8).

The actuation of solenoid valve 188 releases a blast of air from a Y-shaped tube 189 at the rear of the anvil 27 as the anvil descends to blow the trimmings of the tube stock 24 into a receptacle (not shown) provided under the carriages 6 and 7. During the air blast the heated knife blades 44 are still down in contact with the freshly cut ends of the tube stock 24 retaining the surfaces thereof at the desired temperature and preventing the air blast from chilling the stock.

Immediately after the trimmings have been removed, the follower 115 will have begun to trace the portion 117 of the cam disk 96 which allows the lever arm 121 to assume its original position. The roller element 123 will reverse the operation of the pneumatic valve 128 and reopen the normally closed microswitch 125. The shifting of the core 127 of the valve 128 will direct air under pressure into the lower end of the cylinder 38 (see Fig. 8) and will raise the arm 29 withdrawing the heated knife blades 44.

Immediately before the knife blades 44 are withdrawn and simultaneously with the bottoming of the cutting edges of the blades, the carriages 6 and 7 on which the guide members 22 and 23 are mounted are backed away slightly from each other to enable the knife blades to retract without obstruction. This action is brought about by a suitable mechanism supported by the vertically extending rods 33 mounted on the slide member 30. The cross piece 34 extending between the rods 33 carries a pin 190 secured to one end for registration with the plunger 191 of a microswitch 192 mounted in the bracket 193 in the manner indicated in the dotted line position of the several elements. The closing of the microswitch 192 completes a circuit across the contacts 194 and closing the hitherto open circuit through conductors 77 between the main power lines 59 and 60 through the switch 63 and energizing the coil 195 of a solenoid 196 (see Fig. 8).

The energizing of the coil 195 of solenoid 196 causes the core 197 to retract, moving the lever arm 198 pivoted at 199 and shifting the core 200 of a pneumatic valve 201. The actuation of the valve 201 causes a bleeding of air from the cylinder 202 above the piston 203 therein, moving the system of lever arms 204 which in turn move the carriages 6 and 7 apart slightly (see Figs. 3 and 8). The position of the cross piece 34 is readily adjustable to permit adjustment of the back away action of the carriages and the depth of the cut effected by the knife blades 44.

This adjustment is facilitated by the provision of a threaded stem 205 which carries the cross piece 34 and extends through an internally threaded boss 206 supported from the rods 33 by means of flanged portions 207. A gear 208 is secured to the other end of the stem 205 and meshes with a second gear 209 mounted on one end of the horizontal shaft 210 rotatably supported in the bearing member 211 forming part of the boss 206. A sprocket 212 is mounted on the other end of shaft 210 and a chain 213 enables the operator to adjust the cross piece 34 to the desired position indicated by the pointer 214 fixed thereto with reference to the scale 215 mounted on one of the flanged portions 207.

By the time the arm 29 carrying the knife blades 44 has retracted to the position shown in Fig. 6, the rotation of the shaft 90 of the timer unit 91 will have moved the several cam disks thereon to the next operative positions. The cam disk 95 will have been rotated to an extent such that the follower 148 associated therewith will have completed its traverse of the low portion 216 and begun tracing the high portion 217 of the disk. Simultaneously therewith, the follower 150 will shift from the low portion 218 to the high portion 219 of the cam disk 99 (see Figs. 14 and 18).

The cam disk 95 controls the action of the pneumatic valve 220 (see Fig. 8) which admits air under pressure to the upper end of the cylinder 221 acting against the piston 222 to actuate the system of lever arms 204 which move the carriages 6 and 7 toward each other to the position shown in Fig. 6. It is in this position that the tacky ends of the trimmed tube stock 24 are jammed together to form the endless tube.

The jamming action is facilitated by the simultaneous application of high pressure air to the airbags A in the clamp arms 19 and 20. This is accomplished by the action of the cam disk 99 which controls the pneumatic valve 223. The valve 223 directs air at a pressure of approximately 45 to 75 pounds per square inch into the airbags A. This insures a positive clamping down of the ends of the tube stock 24 so as to facilitate the joining together of the ends.

As the shaft 90 of the timer unit 91 continues to rotate, the several cams 94 to 100, inclusive, will be returned to their original positions and a single machine cycle will have been completed. The endless tube formed by joining the ends of the tube stock 24 is then removed from the splicing apparatus 1 and it is then ready for the next operation. It should be noted that the cam shaft 90 cannot rotate beyond its starting position for the reason that, when the operator removes his hands after the initial interval is past, the push buttons 54 and 55 will have been restored to their original positions breaking the several contacts 82, 83, 84, and 85.

The breaking of the latter contacts 84 and 85 deenergizes the time relay delay mechanism 88. The contacts 102 remain closed for a predetermined time interval which is adjustable. After the time interval has expired, the coils 56 and 105 of the solenoids 50 and 106, respectively, are simultaneously deenergized. The deenergizing of solenoid 50 as we have already seen, releases the core 49 thereof to enable it to register by the action of the spring 57 with the socket 53 when the slide member 15 is raised to its starting position on the machine slide 17. The cooperation between fingers 51 and 52 on the slide members 15 and 16, respectively, serves to prevent the clamp arm 20 from falling when the clamp arm 19 is latched and both will prevent the arm 29 from descending below the dotted line position in Fig. 3 even though the air or power supply should fail.

The deenergizing of solenoid 106 will restore the several elements shown in Fig. 10 to their positions indicated therein. Thus, when the shaft 90 has completed its full 360 degree cycle of operation, the latching member 113 will have been released so as to engage the abutment 114 on the cam disk 98. This action prevents overrunning of the shaft 90 even though, as a result of the possible failure of a switch, the motor 86 of the timer unit 91 is not deenergized at the proper time in the cycle. Any such continued operation of the motor 86 is absorbed in the dipping action of the friction clutch 93.

Further safety features of conventional types may be provided to stop the splicing apparatus 1 at any stage in its cycle of operations. To this end, the kick bar 224 (see Fig. 1) is provided for the use of the operator and when contacted by him, will cause the safety release mechanism 225 (Fig. 8) to function stopping the operation of the timer 91 by shifting the shaft 90 laterally at any stage of its cycle, when an emergency arises, thereby returning the machine to its starting position. The safety release mechanism 225 also affords a means of controlling the position of the anvil 27 simultaneously with the moving of shaft 90 of the timer unit 91. A manual control pneumatic valve 226 on the base portion 2 of the splicing apparatus 1 serves to control the position of the anvil 27 independently of the safety release mechanism 225 to prevent injury of the operator in cleaning or adjusting the apparatus in that area.

While certain representative embodiments and details have been shown for the purpose of illustrating the invention, it will be apparent to those skilled in this art that various changes and modifications may be made therein without departing from the spirit or scope of the invention.

I claim:

1. Tube splicing apparatus comprising a frame; means on the frame for supporting the ends of the tube stock to be spliced; clamping arms for holding the ends of the stock in position on the supporting means; cutting means for trimming the stock; means for actuating the cutting means to trim the ends of the stock; slide members on the frame for supporting the clamping arms in reciprocable relation to the supporting means; members for actuating the slide means; a releasable latching element for holding the slide member with which it is associated adjacent that extremity of its path of travel remote from the supporting means; a stop on the slide member cooperating with the latching element to prevent the unauthorized movement of the several clamping arms and to limit the travel of the cutting means in the direction of the supporting means; and means for controlling the operation of the latching element.

2. Tube splicing apparatus comprising a frame; means on the frame for supporting the ends of the tube stock to be spliced; a pair of clamping arms for holding the ends of the stock in position on the supporting means; cutting means for trimming the stock; means for actuating the cutting means to trim the ends of the stock; a slide member on the frame for supporting each clamping arm; means for actuating the slide members toward and away from the supporting means; a releasable latching element on one of the slide members for engagement with the frame for holding the slide member adjacent that extremity of its path of travel remote from the supporting means; a stop on each of the slide members, said stop and said latching elements cooperating to prevent unauthorized movement of the clamping arms and to limit the travel of the cutting means in the direction of the supporting means; and means for controlling the operation of the latching element.

3. Tube splicing apparatus of the type defined in claim 2 in which the means for controlling the operation of the latching element comprises an electrical circuit; a cycling means; an electrically energizable release mechanism; and means for energizing the release mechanism at a predetermined time interval in the operation of the cycling means.

4. Tube splicing apparatus of the type defined in claim 3 in which the cycling means comprises a timer mechanism; and means for initiating the operation of the timer mechanism through a predetermined cycle by closing the electrical circuit.

5. Tube splicing apparatus of the type defined in claim 4 in which the timer mechanism comprises a cam shaft; means for rotating the shaft; and a series of cam disks mounted on the shaft, said cam disks being so disposed that they control the operation of the several actuating means when the initiating means are operated to close the electrical circuit through the shaft rotating means.

6. Tube splicing apparatus of the type defined in claim 5 in which the initiating means comprise a pair of push button switches which are so constructed and arranged that the release of either within a predetermined time interval after the initiation of the timer mechanism causes the several actuating means to restore the clamping arms and the cutting means to their original positions remote from the supporting means until the cycle of the timer mechanism thus initiated is completed.

7. Tube splicing apparatus comprising a frame; horizontally disposed guides on the frame for supporting the ends of the tube stock during the trimming and splicing operations; cutting means for trimming the ends of the stock; means actuating the cutting means along a path of travel substantially normal to the guide means; clamping arms for holding each end of the stock in place on the guides; a slide member on the frame for each clamping arm; means which are operable independently of each other for actuating each of the slide members toward and away from the guides; a releasable latching element on one of the slide members to engage the frame and hold the clamping arms in a position in its path of travel remote from the supporting means; a first finger mounted on the slide member with which the latching element is associated; a second finger on the other slide member for engagement with the first, said fingers and said latching element cooperating to prevent the unauthorized lowering of the clamping arms and to limit the extent of travel of the cutting means with respect to the guides; means for releasing the latching element; an electrical control circuit; a timer mechanism for causing the actuating means to move the clamping arms and the cutting means in the direction of the guides; and a pair of electrical push button switches so disposed in the control circuit that their simultaneous actuation is required to energize the releasing means to free the clamping arms and thereafter to cause the withdrawal of the clamping arms and the cutting means by their actuating means if either switch is opened in advance of the contact of the clamping arms and the cutting means with the guides.

8. A safety control device for tube splicing apparatus embodying supporting means, clamping arms, and cutting means, said clamping arms and said cutting means being shiftably mounted for substantially simultaneous contact with the supporting means in the course of their operation, said device comprising an electrical control circuit; a timer mechanism for controlling the actuation of the clamping arms and the cutting means in accordance with a predetermined cycle of operations; and a pair of push button switches in the circuit which, when simultaneously depressed, initiate the operation of the timer mechanism through its cycle setting the clamping arms and the cutting means in motion toward the supporting means, said switches being so arranged in the circuit that the timer mechanism becomes inoperative, thereby causing the clamping arms and the cutting means to move away from the supporting means, in the event that either push button is released before the clamping arms and the cutting means achieve substantial contact with the supporting means.

9. A safety control device for tube splicing apparatus embodying supporting means, clamping arms, cutting means, said clamping arms and said cutting means being shiftably mounted with respect to the supporting means, and means for shifting the clamping arms and the cutting means toward and away from the supporting means, said device comprising an electrical control circuit; a timer mechanism for controlling the shifting means in accordance with a predetermined cycle of operation; and a pair of push button switches connected in the circuit which, when simultaneously depressed, initiate the operation of the timer mechanism causing the shifting means to set the clamping arms and the cutting means in motion toward the supporting means, said switches being so disposed in the circuit that the timer mechanism is rendered incapable of controlling the shifting means and the latter shifts the clamping arms and the cutting means away from the supporting means in the event that either push button is released before the clamping arms, and the cutting means are in substantial contact with the supporting means.

10. A safety control device of the type defined in claim 9 in which a latching element is provided on one of the clamping arms to prevent its shiftable movement; and means associated with the timer mechanism to disengage the latching element at a predetermined interval in the operating cycle.

11. A safety control device of the type defined in claim 10 in which a stop is provided on each of the clamping arms for preventing the shiftable movement of the cutting means until the latching element on the clamping arms is disengaged.

12. A safety control device for tube splicing apparatus embodying supporting means, a movable clamping arm, and a movable cutting means, said clamping arm and said cutting means being originally disposed in spaced relation to the supporting means, together with actuating means for bringing the clamping arm and the cutting means into substantially simultaneous contact with the supporting means, said device comprising an electrical control circuit; a timer mechanism embodying a motor, a cam shaft connected to the motor and a series of cam disks on the cam shaft; means operated by the cam disks for causing the actuating means to shift the clamping arm and the cutting means from their original positions in accordance with a predetermined cycle of operations; and a pair of push button switches which, when simultaneously depressed, initiate the operation of the timer mechanism causing the clamping arm and the cutting means to approach the supporting means, said switches being so disposed in the electrical circuit that the action of the clamping arm and the cutting means is arrested and they are returned to their original positions with respect to the supporting means in the event that either push button is released before substantial contact of the clamping arm and the cutting means with the supporting means is achieved.

13. Tube splicing apparatus comprising horizontally disposed guide members; movable clamping arms for holding the ends of the tube stock to be spliced in place on the guide members; movable cutting means for trimming the ends of the tube stock; a latching element and cooperating stops on the clamping arms to retain the clamping arms and the cutting means originally in spaced relation to the guide members; and actuating means for moving the clamping arms and the cutting means toward the guide members; an electrical control circuit; a timer mechanism including a motor, a cam shaft driven by the motor and a series of cam disks mounted on the cam shaft; a release mechanism for disengaging the latching element; means operated by each of the cam disks to cause the actuating means to move the clamping arms and the cutting means substantially simultaneously from their original positions into contact with the guide members; and a pair of switches so connected in the circuit that, when both switches are simultaneously closed, the release mechanism is energized freeing the clamping arms and the cutting means, the motor of the timer mechanism begins to rotate the cam shaft and the cam disks through the predetermined cycle of operations, and the actuating means causes the clamping arms and the cutting means to approach the guide members while the downward motion of the clamping arms and the cutting means is arrested causing the clamping arms and the cutting means to return to their original positions in the event that either of the switches is opened.

14. Tube splicing apparatus of the type defined in claim 13 in which means are provided in the timer mechanism for rendering the cams on the cam shaft therein incapable of operating the several actuating means at any stage during the operating cycle once the timer mechanism is set in motion.

15. Tube splicing apparatus of the type defined in claim 14, in which the means rendered the cams of the timer mechanism inoperative comprise means for mounting the cam shaft of the timer mechanism for axial movement and means for shifting the cam shaft.

16. Tube splicing apparatus of the type defined in claim 14 in which a manually operable control device is provided to operate the means in the timer mechanism for rendering the cams thereof inoperative.

17. Tube splicing apparatus comprising a frame; a pair of horizontally disposed guide members to support the ends of the tube stock to be spliced; a clamping arm for each guide member to hold the stock in place for the cutting and splicing operations; a cutting means for trimming the ends of the stock; slide members on the frame supporting the clamping arms for shiftable movement from an inoperative position in which the clamping arms are spaced away from the guide members to one in which they substantially contact the guide members; means supporting the cutting means for shiftable movement with respect to the guide members; pneumatic cylinders for shifting the clamping arms and the cutting means; valves controlling the operation of the cylinders; a latching element on one of the clamping arms engaging the frame for temporarily retaining the clamping arm in inoperative position; a finger on the clamping arm having the latching element thereon; a second finger on the other clamping arm for engagement with the first to retain that clamping arms in inoperative position and to restrict the extent of movement of the cutting means; means for releasing the latching element and freeing both clamping arms and the cutting means; a timer for controlling the entire sequence of operations of the apparatus; and an electrical control circuit including the timer; a motor in the timer connected into the control circuit; a cam shaft connected to the motor; a plurality of cam disks on the cam shaft for actuating the valves which control the pneumatic cylinders; means for mounting the cam shaft for axial movement; means for shifting the mounting means; a pair of switches connected in the control circuit, said switches being so disposed that, when both are simultaneously closed, the releasing means is energized to disengage the latching element and the motor is energized rotating the cam shaft causing the cam disks thereon to operate the valves which control the pneumatic cylinders which shift the clamping arms and the cutting means now free to operate in the direction of the guide members and, when either one of the switches is opened, the releasing means is de-energized and the shifting means moves the cam shaft axially in its mounting means causing the cam disks to reverse the operation of the valves controlling the pneumatic cylinders which permits the clamping arms and the cutting means to return to their inoperative positions; and a manually operable control device for actuating the shifting means to move the cam shaft and render the cams inoperative to continue the several operations in any given cycle.

EVERETT D. GEORGE.

REFERENCES CITED

The following references are of record in the file of this patent:

UNITED STATES PATENTS

| Number | Name | Date |
| --- | --- | --- |
| 2,024,577 | Haase | Dec. 17, 1935 |
| 2,272,881 | Stevens | Feb. 10, 1942 |
| 2,273,463 | Campbell et al. | Feb. 17, 1942 |

Certificate of Correction

Patent No. 2,561,019                                                      July 17, 1951

EVERETT D. GEORGE

It is hereby certified that error appears in the printed specification of the above numbered patent requiring correction as follows:

Column 5, lines 20 and 21, for "uppermose" read *uppermost*; column 14, line 55, for "members" read *means*; same line, for "means" read *members*; column 15, line 6, for "stop" read *stops*; line 59, for "arms" read *arm*; column 17, line 64, for "rendered" read *rendering*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*